May 26, 1936.  S. A. HUEBNER  2,042,312
TIRE SPREADER
Filed Oct. 7, 1932
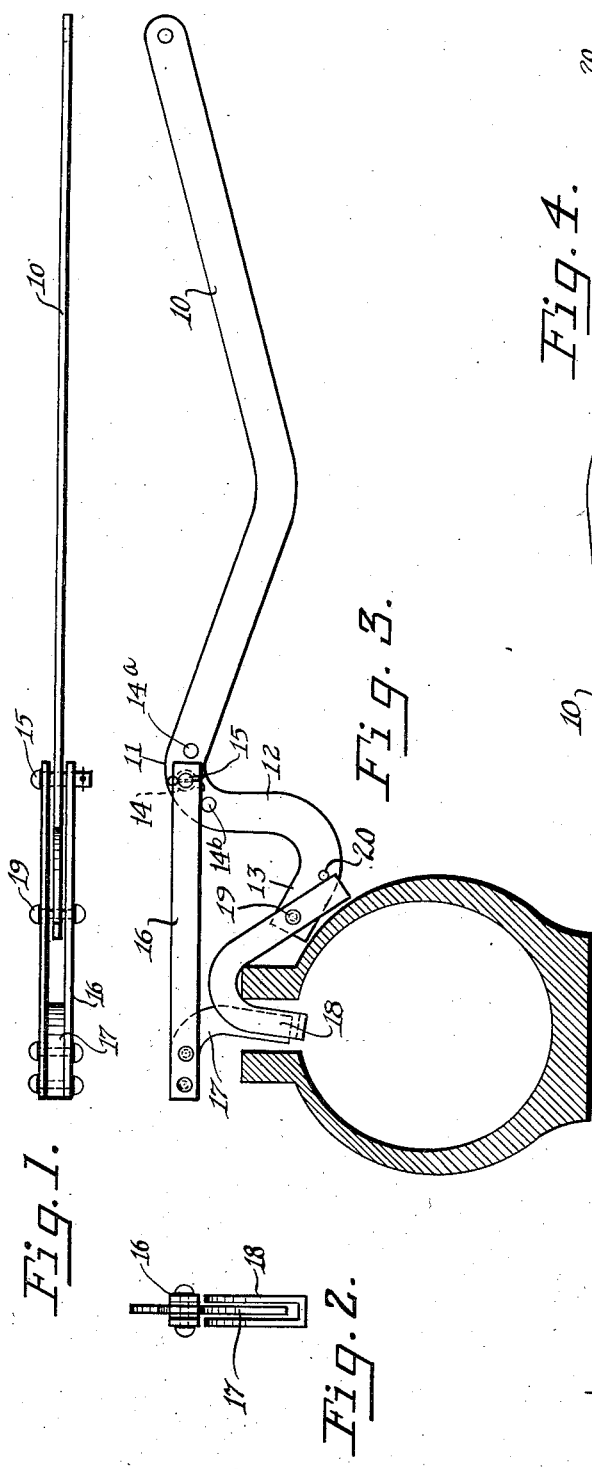
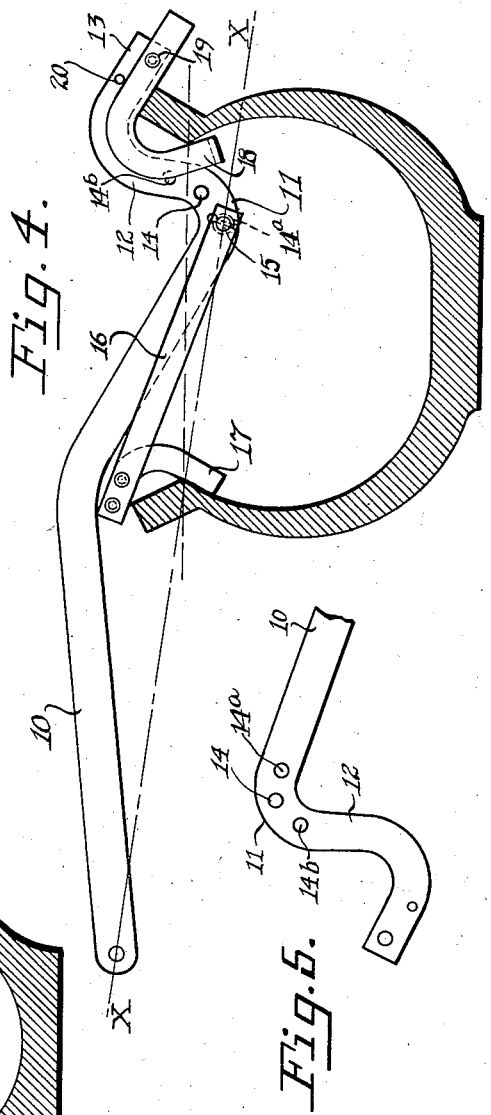
INVENTOR
SAMUEL A. HUEBNER
BY W. F. Woolard
ATTORNEY Patented May 26, 1936

2,042,312

UNITED STATES PATENT OFFICE 2,042,312

TIRE SPREADER

Samuel A. Huebner, Forest Junction, Wis.

Application October 7, 1932, Serial No. 636,729

4 Claims. (Cl. 152—27)

The invention relates to devices which have for their purpose the spreading apart of the sides of a pneumatic tire casing, so as to make the interior of the same easily accessible, for the insertion and correct positioning of the inner tube, and for purposes of inspection and repair.

As is well known, tire casings of large cross-sectional diameter, are very stiff and unyielding, and can be opened only by the application of considerable force. Mechanical devices of some kind are necessary to accomplish this result, and the devices must be such as to maintain the tire casing in opened position, in order to permit the desired work to be conveniently performed.

The device embodying my invention is well adapted for the easy accomplishment of these objects. It resides in two independent hooks or fingers which are adapted to be brought into the space occupied by one, so that such hooks or fingers may easily be entered in the narrow opening at the meeting edges of the tire casing, to engage the same upon its inside.

One hook or finger is in fixed position at one end of a short bar, which latter is pivoted at its other end at an intermediate point on a lever, upon the short arm of which the other hook or finger is mounted so that it may pivot thereon. The short end of the lever is bent edgewise from the longitudinal axis of the same, for purposes which later will be explained. By throwing the bent lever over, the hooks or fingers engaged inside the tire casing are caused to move away from each other, and in such movement, the sides of the tire casing are spread apart to open the same widely. The bar and short arm of the bent lever act as a toggle, so that with little effort, a very stiff tire casing may easily be opened. The pivotal point between the bar with the bent lever passes across the center line of the toggle, so that when the lever has received its full throw, the tire casing is maintained in open condition for as long a time as may be desired, and without any liability to collapse due to the tendency of the opened tire to contract to its normal condition.

The foregoing and other features residing in the invention will now be described, and the novelty of the same will be pointed out in the appended claims.

In the accompanying drawing:

Figure 1 is a plan view of a tire spreading device constructed in accordance with my invention.

Fig. 2 is a view of the same in end elevation, looking from the left of Fig. 1.

Fig. 3 is a transverse sectional view through a tire casing, showing the manner in which the hooks or fingers are inserted in the narrow opening at the meeting edges of the walls of the tire casing, preliminary to spreading the latter.

Fig. 4 is a similar view showing how the device is operated to spread apart the walls of a tire casing, and maintain the same in opened position.

Fig. 5 is a view of the short arm of the lever, showing the bent end and offset extension, with the arrangement of the apertures at the bend of the lever through which adjustment of the throw may be effected.

In the drawing, the numeral 10 indicates a hand operated lever, which may be straight or slightly angular for the greater part of its length, and bent near one end as at 11, to produce an offset portion 12, with a return 13 at its extreme end, the latter being extended in substantial parallelism with the longitudinal axis of the lever, as indicated by the broken line $x$—$x$ across Fig. 4, for example. The portions 11, 12 and 13 together provide an S-shaped formation at the end of the lever, the bent portion 11 being offset laterally from the lever axis. The lever 10, in the region of the bend 11 is provided with a perforation 14, for the reception of a pivot pin 15, passed also through registering perforations in one end of the push bar 16, the latter being comprised conveniently of two spaced parallel strips, between which the lever 10 is received at its pivotal point. Other perforations 14$^a$ and 14$^b$ may be provided to permit adjustment of the throw to adapt the device to use in connection with tire casings of different diameters, and also to vary the amount of the spread or opening in tire casings of the same diameter. If adjusted through either perforation 14$^a$ or 14$^b$, the telescoped, normal position shown in Fig. 3, will be changed, and the hooks or fingers be slightly separated or widened beyond the space in which they are assembled as one. Between the strips at the free end of the push bar 16, an angular hook or finger 17 is fixed.

A co-operating pulling bar formed as a hook or finger 18, produced from a flat strip first bent at its midlength into U-shape, and then bent edgewise, is pivoted to the extended end 13, of the bent short end of the lever 10, by means of a pin 19, passed through aligned perforations in the parts. The sides of the U-shaped hook or finger 18 are spaced so that the extended end 13 may be positioned between them at or near their free ends, and the projecting end of the hook or finger 17 be permitted to pass freely into the space at the other end, to cause the parts 17 and 18 when thus assembled together, to have a combined width not substantially greater than the width of one of such parts. This method of assembly to produce a compact structure, permits the hooks or fingers 17 and 18 to be easily entered into the narrow space separating the walls of the tire casing. A pin 20 passed through the extension 13 of the bent end of the lever 10, projects from the sides thereof, and in position to act as a stop, to limit the rocking movement of the hook or finger 18, beyond that shown in Fig. 3, so that the pivoted push bar 16 carrying the hook or finger 17, may fall easily into the position of normal assembly, before described, and as shown in the said Fig. 3.

It will be noted that the pin 20 serves to support the finger 18 in a predetermined position on the lever 10, as indicated in Fig. 3, and that when in this position the finger 18 coacts with the finger 17 to support the latter in the position shown. When thus positioned, both fingers 17 and 18 may be entered into the tire solely by manipulation of the lever 10, and without requiring separate manual guiding of either of those fingers.

In operation, the hooks or fingers 17 and 18 are inserted in the narrow opening of the tire casing, so as to engage the beads of the latter, as shown in Fig. 3. The lever 10 is then thrown to the position shown in Fig. 4, with the result that the side walls of the tire casing are spread apart to open the same widely, and permit easy access to the inside, for the insertion of the inner tube, or for inspection or repair. In such movement of the lever 10, and the toggle motion, the pivotal point 15 between the bend 11 and the push bar 16 is carried below the center line of the thrust upon the hooks or fingers 17 and 18, by the reaction of the tire casing. As shown in Fig. 4, the curved portions of the hooks or fingers 17 and 18, pass around and engage underneath the beads of the tire casing, with the extreme ends of the hooks or fingers more widely separated, so as to prevent the spreading device, from slipping upwardly from its anchored position. The direction of the thrust is indicated in Fig. 4 by the broken line extending between the beads of the tire casing. The toggle action which takes place in the over center throw, effectively maintains the tire casing in the opened position shown in Fig. 4, without liability to unseating the device by the collapse of the distended tire casing. The offsetting of the short end of the lever 10, whereby the bend 11 may pass well into the tire casing, and carrying with it the pivot pin 15 to a position also within the tire casing and below the line of contractive thrust upon the hooks or fingers 17 and 18, insures this result. The longitudinal axis of the lever 10 is indicated by the broken line $x$—$x$, running diagonally across Fig. 4, and extends in a line passing from the pivot pin 15, to the free end of the longer arm of the lever 10. The recess formed at the inside angle of the offset extension 12—13, receives the adjacent bead of the tire casing, and affords a clearance which permits the throw of the pivot pin 15 over the center line and maintains the tire casing in the opened position shown in Fig. 4. Reverse throw of the lever 10, restores the parts of the device to the normal position indicated in Fig. 3. The device will operate as efficiently if the long arm of the lever 10 be straight, instead of kinked, as shown.

Two of the tire spreading devices shown may be used to advantage, inasmuch as the sections of the tire casing may be opened step-by-step, in succession, until the work has been completed.

Having thus described my invention, what I claim and desire to secure by Letters Patent of the United States, is:

1. A tire spreader comprising a lever having an S-shaped formation at one end, spreader bars pivotally attached respectively to the inner and outer portions of said S-shaped formation, fingers on said bars engageable within a tire to spread the same when said lever is swung relative to said bars, said inner portion of said S-shaped formation being arranged to carry the pivoted end of one of said bars into the tire and through a dead center position to thereby releasably retain said lever in tire spreading position.

2. A tire spreader comprising a lever having an S-shaped formation at one end, a push bar pivotally attached to the inner portion of said formation and having a tire engaging hook thereon, and a pull bar pivotally attached to the outer portion of said formation and having a tire engaging hook thereon, said inner portion of said S-shaped formation being arranged to carry the pivoted end of said push bar into the tire and through a dead center position when said lever is swung into tire spreading position to thereby releasably retain said lever in tire spreading position.

3. A tire spreader comprising a single supporting and operating lever, a pair of independently movable tire engaging elements pivotally mounted thereon, said elements being insertable into a tire and operable in response to actuation of said lever to spread the tire, and means for maintaining said elements in a predetermined position relative to said lever and to each other so that both elements may be simultaneously entered into tire engaging position solely by manipulation of said lever.

4. A tire spreader comprising a single supporting and operating lever, a pair of independently movable tire engaging elements pivotally mounted thereon, said elements being insertable into a tire and operable in response to actuation of said lever to spread the tire, and means for limiting the pivotal movement of one of said elements to sustain the same in a predetermined position on said lever to thereby facilitate entry of said element into tire-engaging position, said elements coacting when said first named element is thus positioned to effect support of the other of said elements so that both elements may be entered into tire engaging position solely by manipulation of said lever.

SAMUEL A. HUEBNER.